(12) United States Patent
Yen et al.

(10) Patent No.: US 7,636,645 B1
(45) Date of Patent: Dec. 22, 2009

(54) SELF-CONTAINED INERTIAL NAVIGATION SYSTEM FOR INTERACTIVE CONTROL USING MOVABLE CONTROLLERS

(75) Inventors: Wei Yen, Los Altos Hills, CA (US); Ian Wright, Mountain View, CA (US); Xiaoyuan Tu, Sunnyvale, CA (US); Stuart Reynolds, Palo Alto, CA (US); William Robert Powers, III, San Francisco, CA (US); Charles Musick, Belmont, CA (US); John Funge, Sunnyvale, CA (US); Daniel Dobson, Atherton, CA (US); Curt Bererton, Burlingame, CA (US)

(73) Assignee: Ailive Inc., Mountain View, CA (US)

( * ) Notice: Subject to any disclaimer, the term of this patent is extended or adjusted under 35 U.S.C. 154(b) by 40 days.

(21) Appl. No.: 11/820,207

(22) Filed: Jun. 18, 2007

(51) Int. Cl.
G60F 3/00 (2006.01)
(52) U.S. Cl. .................. 702/152; 702/150; 702/153; 702/179
(58) Field of Classification Search ......... 702/150–152, 702/156, 158, 182, 189, 197, 153, 179; 463/37; 600/587; 700/245
See application file for complete search history.

(56) References Cited

U.S. PATENT DOCUMENTS

| 5,645,077 | A | * | 7/1997 | Foxlin .................. 600/587 |
|---|---|---|---|---|
| 5,778,157 | A | | 7/1998 | Oatman et al. |
| 5,995,955 | A | | 11/1999 | Oatman et al. |
| 6,072,466 | A | | 6/2000 | Shah et al. |
| 6,192,338 | B1 | | 2/2001 | Hazsto et al. |
| 6,201,948 | B1 | | 3/2001 | Cook et al. |
| 6,216,014 | B1 | | 4/2001 | Proust et al. |
| 6,363,384 | B1 | | 3/2002 | Cookmeyer, II et al. |
| 6,374,155 | B1 | * | 4/2002 | Wallach et al. ............... 700/245 |
| 6,389,405 | B1 | | 5/2002 | Oatman et al. |
| 6,425,582 | B1 | | 7/2002 | Rosi |
| 6,427,063 | B1 | | 7/2002 | Cook et al. |
| 6,467,085 | B2 | | 10/2002 | Larsson |
| 6,477,553 | B1 | | 11/2002 | Druck |
| 6,561,811 | B2 | | 5/2003 | Rapoza et al. |
| 6,636,860 | B2 | | 10/2003 | Vishnubhotla |
| 6,640,231 | B1 | | 10/2003 | Andersen et al. |
| 6,892,349 | B2 | | 5/2005 | Shizuka et al. |
| 7,054,928 | B2 | | 5/2006 | Segan et al. |
| 7,263,462 | B2 | | 8/2007 | Funge et al. |
| 7,296,007 | B1 | | 11/2007 | Funge et al. |

(Continued)

FOREIGN PATENT DOCUMENTS

| WO | WO 2006/014560 A2 | 2/2006 |
|---|---|---|
| WO | WO 2006/015234 A2 | 2/2006 |

*Primary Examiner*—Eliseo Ramos Feliciano
*Assistant Examiner*—Felix E Suarez
(74) *Attorney, Agent, or Firm*—Joe Zheng (57) ABSTRACT

A movable game controller for controlling aspects of a computer controlled game display with apparatus for determining the linear and angular motion of that movable controller. The apparatus includes a plurality of self-contained inertial sensors for sensing the tri-axial linear and tri-axial angular motion of the moving controller. Each sensor is mounted at a fixed linear position and orientation with respect to the others. The linear and angular motion of the controller is computed from the correlated motion sensor readings of each of the plurality of self-contained inertial sensors.

111 Claims, 6 Drawing Sheets

Flow diagram.

U.S. PATENT DOCUMENTS

| | | |
|---|---|---|
| 2002/0165839 A1 | 11/2002 | Taylor et al. |
| 2003/0041040 A1 | 2/2003 | Bertrand et al. |
| 2003/0084015 A1 | 5/2003 | Beams et al. |
| 2004/0010505 A1 | 1/2004 | Vishnubhotla |
| 2006/0036398 A1 | 2/2006 | Funge et al. |
| 2007/0060384 A1 * | 3/2007 | Dohta ................ 463/43 |
| 2007/0260567 A1 | 11/2007 | Funge et al. |

* cited by examiner

Figure 1: Composite controller made by attaching a motion sensing dongle to a motion sensing game controller.

Figure 2: Composite controller made up from multiple motion sensing game controllers.

Figure 3: Composite controller made up from multiple motion sensing game controllers.

Figure 4: Motion sensing controller capable of tracking relative angular and linear motion.

Figure 5: Interactive.

Figure 6: Flow diagram.

SELF-CONTAINED INERTIAL NAVIGATION SYSTEM FOR INTERACTIVE CONTROL USING MOVABLE CONTROLLERS

BACKGROUND OF THE INVENTION

1. Field of Invention

The present invention relates to self-contained inertial navigation systems (INS) for interactive control using movable controllers in applications like computer display games.

2. Related Art

The Nintendo Wii Remote™ wireless controller is an example of the most recent state of the art advances in user interactive controllers for computer display game systems. It is a movable wireless remote controller, which is hand-held by the interactive user, that transmits input data to the computer controlled game display system via conventional short range wireless RF transmissions e.g., a Bluetooth™ system, and receives data via infra-red light sensors. This game controller is described in detail in Published U.S. Application US2007/0060384, (Mar. 15, 2007).

With movable controllers for game systems like the Nintendo Wii, it is desirable to use a self-contained INS system to sense and track the relative linear and angular motion of the movable controller. Current state of the art movable controllers do not have this ability. For example, the Wii Remote can use data it receives via its infra-red light sensors to infer information about its position and orientation from a set of external infra-red light sources that have been placed in the environment in some known configuration. But the use of light sensors means that the device depends on the light sources and is not, therefore, self-contained. The use of external signal sources is burdensome because the user must set up and configure those external sources. Furthermore, the user must restrict movements made with the controller so as to keep those external sources in view. A self-contained system has no such restriction on movement and requires no setup or configuration of external sources by the user.

Self-contained INS systems typically use sensors like accelerometers and gyroscopes. State of the art movable controllers like the Wii Remote use a tri-axial accelerometer. However, a single tri-axial accelerometer is insufficient to calculate all six degrees of freedom required to infer the linear and angular motion of a movable controller. In fact, it is impossible to even determine whether the controller is being translated or rotated, since a fixed rotation and a linear acceleration could generate the same set of readings on a single tri-axial accelerometer. However, by making assumptions on how the controller is held and along which axis it will be moved, it is sometimes possible to track the relative linear and angular motion. For example, in state of the art games for the Nintendo Wii, players are instructed on how to hold and move their controller. By assuming the players are approximately following the instructions, it is possible to interpret the signal from the tri-axial accelerometer to roughly track the relative linear and angular motion of the controller. But there is a wide class of games and other applications where it is undesirable to constrain how the user may move or hold the movable controller. State of the art movable controllers are therefore unnecessarily limiting.

To review the background of sensing the positions and tracking the paths of objects moving in a three dimensional space, the tracking is done by inertial navigation systems (INS) which use a combination of accelerometers and gyroscopes to create or compute an inertial frame within which accelerations represent strictly linear acceleration in the world frame. If one knows the world frame linear acceleration of an object over time, one can calculate the current position of that object over time with respect to its starting location. If one knows the angular velocities of an object over time, one can provide its orientation at any point in time. Conventionally, in the tracking of objects, linear accelerations combined with angular velocities are necessary and sufficient for providing location and orientation of an object with respect to a starting location. There are six unknowns that must be solved for at every point in time. Most INSs (inertial navigation systems) use gyroscopes to fix or solve for the three angular velocities. Once the orientation over time is known, accelerometers can be used to track the three linear accelerations as described above. Reference is made to the publication, "*Radar, Sonar, Navigation & Avionics Strapdown Inertial Navigation Technology, $2^{nd}$ Edition*", by D. Titterton and J. Weston, published in 2005 as part of the IEE Radar, Sonar, Navigation and Avionics Series, for an introduction to and further information on the field of inertial navigation systems.

Reference is also made to the publication, "*Design and Error Analysis of Accelerometer-Based Inertial Navigation Systems*", Chin-Woo Tan et al., Published in June, 2002 by the University of California at Berkeley for the State of California PATH Transit and Highway System which is hereby incorporated by reference. This is a study of the feasibility of inertial navigation systems that use only accelerometers to compute the linear and angular motions of a rigid body. This publication relates to systems for measuring linear and angular velocities of motor vehicles and the like. Its determinations track motion on scale of tens of meters accuracy on a time scale of tens of minutes.

SUMMARY OF THE INVENTION

The present invention provides a self-contained INS system for interactive control using movable controllers. In the preferred embodiment the movable controller provides interactive control over some aspect of a computer display game system by tracking the relative linear and angular motion of the moving controller.

In one embodiment, the present invention involves incorporating a plurality of self-contained inertial sensors into a movable controller, and correlating the motion sensed by each sensor, so that both the three dimensional linear path and the angular orientation of the moving controller may be accurately tracked. For best results, the plurality of self-contained inertial sensors must be capable of tracking along six axes: three for linear acceleration along the three linear axes, and three axes for determining angular motion. Thus, the combination of one tri-axial accelerometer and one tri-axial gyroscope in the movable controller will function very effectively. However, those skilled in the art will be aware that various other combinations of sensors will also function effectively. For example, six accelerometers can be arranged in a known layout to provide an effective INS system for interactive control using a movable controller.

In one embodiment of the present invention, existing game controllers having self-contained inertial sensors that sense motion along less than six axes, e.g. a tri-axial accelerometer, may be enhanced by additional self-contained inertial sensors removably attached to the game controller to provide a composite game controller. Such a composite game controller would be capable of sensing the linear and angular motion of the composite controller. The composite controller would comprise the combination of at least one controller containing self-contained inertial sensors for sensing the linear/angular motion of the moving controller; one or more self-contained inertial sensors, removably attached to the controller at a fixed linear position and orientation with respect to the controller, for further sensing the linear and angular motion of the moving controller; and apparatus for correlating the motion sensed by each of said controller sensors and separate sensors. In such a composite controller, the combined sensors should provide motion sensing along all six axes. For example, if the conventional game controller has a tri-axial accelerometer, then the attached set of sensors could include one tri-axial gyroscope or a plurality of attached gyroscopes providing at least combined tri-axial sensing. The attached sensors should be mounted on the controller in a known position with respect to the conventional game controller.

If the composite controller still does not provide sensing along all six axes, it may still be more useful than the basic controller. In particular, the constraints under which the user may hold and move the controller might be able to be relaxed without damaging the ability to track the composite controller's linear and angular motion.

In one embodiment of the invention, the attached sensors may be one or more other controllers that are attached to the basic controller. A separate device may be provided so that the controllers can be attached in some known configuration. Alternatively, appropriate banding may be used for attachment. In such case that the banding does not result in precisely known relative positions and orientations of all the controllers to one another, a separate calibration phase may be required.

In one embodiment, a device with one or more self-contained inertial sensors may be attached to a basic conventional controller that is incapable of tracking linear and angular motion of the basic controller to convert the composite controller into one which tracks both angular and linear motion. With a conventional Wii Remote controller, the removably attached sensors are in the form of a dongle that may be inserted into a port in the conventional basic controller.

As will be subsequently described, the above described invention may be implemented as a method for dynamically determining the linear and angular motion of a movable game controller, and as a computer program for dynamically determining the linear and angular motion of a movable controller.

In accordance with another aspect of the invention, a computer game system is provided in which aspects of the game are controlled by the above defined movable controllers having apparatus for determining their linear and angular motion. For example, a game might interpret the motion of the controller to drive the animation of a sword on the game display such that the sword on the display moves in an ostensibly similar manner to the motion of the controller. Since a self-contained INS system can only track motion relative to the position and orientation of the controller when tracking began, the game may assume the controller was held in some initial starting position and orientation, in which case, the motion applied to the on screen object being controlled will only be correct with respect to this assumption about the initial starting position and orientation. Additional sensors, possibly not self-contained, and techniques could be used to more accurately determine the starting position and orientation.

This brief summary has been provided so that the nature of the invention may be understood quickly. A more complete understanding of the invention may be obtained by reference to the following description of the preferred embodiments thereof in connection with the attached drawings.

DETAILED DESCRIPTION OF THE INVENTION

Definitions

In the description of the invention herein, above and hereinafter, the following definitions are offered to clarify the terminology used:

Self-contained inertial sensor: a device that requires no external signal sources to be placed in the environment for measuring acceleration of a moving body along from one to three axes of the six possible linear and angular axes. Unless stated otherwise, the word sensor is understood to refer to a self-contained inertial sensor. For illustrative purposes, in this document, we describe instantiations using accelerometers and gyroscopes. However, those skilled in the art would immediately recognize that other devices could be used as self-contained inertial sensors. For example, a camera that compares images over time (such as the camera used in an optical mouse) could be used as a self-contained inertial sensor. But an infrared camera that is designed to work by tracking infrared sources or markers that have been deliberately placed in the environment is not an example of a self-contained inertial sensor.

Accelerometer: a device for measuring acceleration along one to three axes at a point on a moving body. An accelerometer is an example of a self-contained inertial sensor. The device can be from one to tri-axial dependent upon the number of axes it measures at a given location. For example, a tri-axial accelerometer measures acceleration along three axes at the point where the accelerometer is located. A rigid-body can move independently in any of six possible degrees of freedom, three linear translations and three rotations. Therefore, without additional assumptions about constraints on the motion path, a single accelerometer can never be sufficient to determine the linear and angular motion of a rigid body to which it is attached. Moreover, without making additional assumptions about constraints on the motion path, a single (even tri-axial) accelerometer can not even determine the motion of the rigid body it is attached to along a single degree of freedom. That is because, without additional information, there is no way to know whether the source of the accelerations it is experiencing are from linear or from angular motion of the rigid body to which it is attached. However, readings from a set of accelerometers placed at different points on a rigid body in some suitable configuration can be processed to determine the linear and angular motion of the rigid body along all six degrees of freedom. Note that, even at rest, an accelerometer is responsive to the Earth's, or any other large enough object's, gravitational field.

Gyroscope: a device for measuring angular velocity around one to three axes at a point on a rotating object. A gyroscope is an example of a self-contained inertial sensor. The device can be from one to tri-axial dependent upon the number of axes it measures at a given location. For example, a tri-axial gyroscope measures angular velocity around three axes at the point where the gyroscope is located. While a tri-axial gyroscope is sufficient to track a rigid body's orientation over time, it provides no information with respect to linear movements of the body in space.

Controller: a movable game controller, preferably but not necessarily wireless and hand-held, with one or more self-contained motion sensors included in the controller, and providing output data to control an associated interactive application such as a computer game.

Basic Controller: A controller, as defined above, lacking sufficient self-contained inertial sensors to track linear and angular motion in all six degrees of freedom.

Composite Controller: A controller, in accordance with this invention in which another controller or device containing self-contained inertial sensors has been attached to a basic controller to enhance the motion sensing capability of the basic controller.

DESCRIPTION

Figure 1:
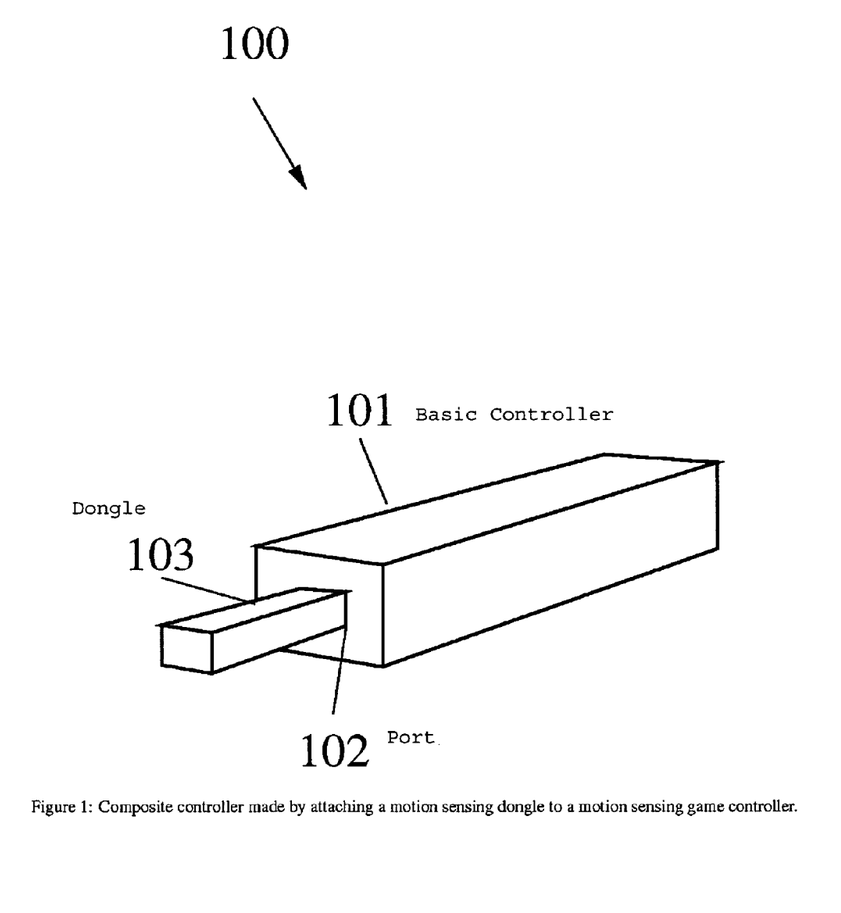
FIG. 1 shows an illustrative embodiment in which two motion sensing game controllers or like housings including self-contained inertial sensors may be detachably attached by a dongle attachment to provide a game controller in accordance with the invention.
Figure 2:
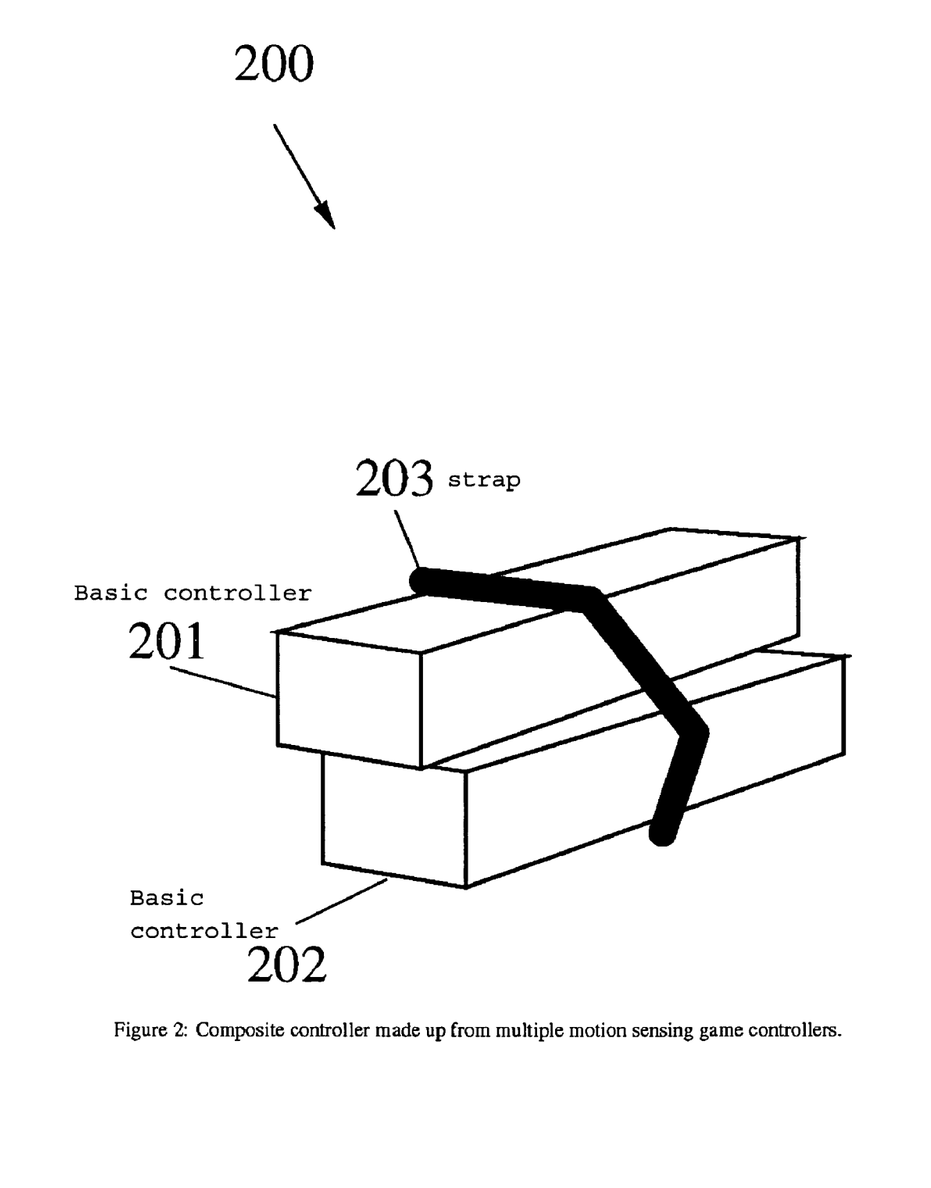
FIG. 2 shows another illustrative embodiment in which two motion sensing game controllers or like housings including self-contained inertial sensors may be detachably attached to provide a composite game controller in accordance with the invention.
Figure 3:
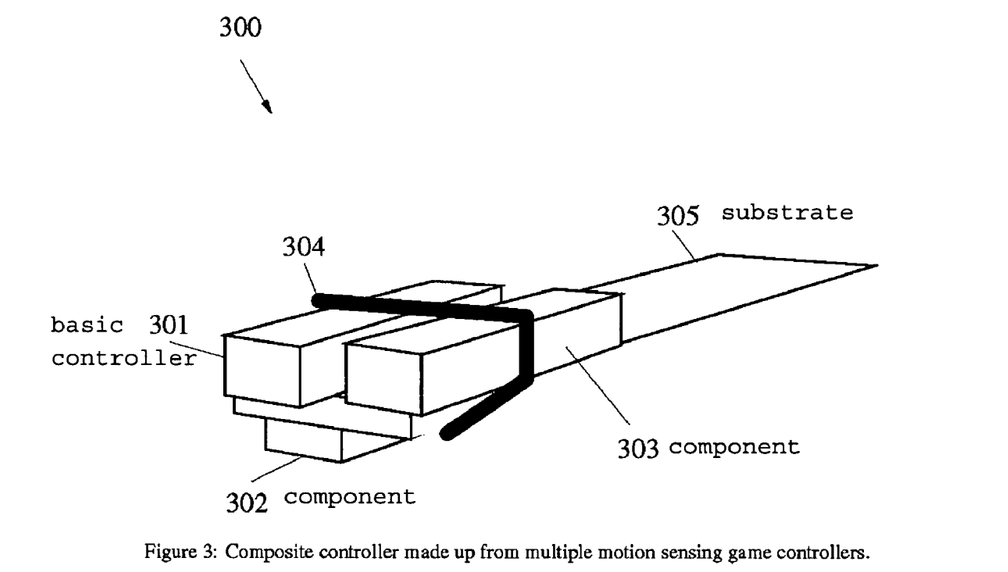
FIG. 3 shows a further illustrative embodiment in which three motion sensing game controllers or like housings including self-contained inertial sensors may be detachably mounted on a substrate to provide a game controller in accordance with the invention.

Several embodiments of the invention will be described in detail. FIGS. 1-3 each depict one of several possible embodiments of a composite game controller in which a unitary output from the composite game controller representative of the linear and angular motion of the moving composite controller must be provided.

With reference to FIG. 1, a composite controller is constructed using a dongle connection. In particular, the ancillary controller or housing containing the ancillary self-contained inertial sensors 103 is received in the port 102 of the basic game controller 101. In such a linkage, the outputs from the self-contained inertial sensors in the dongle 103 may be combined with the output of the self-contained inertial sensor in controller 101 by the data processing unit in controller 101 to provide the combined output of the whole composite controller. For best results, the combined sensing in all of the self-contained inertial sensors in the composite controller should provide for motion sensing along six axes: three linearly independent axes for the sensing of the linear motion of the moving composite controller relative to the three linear axes, and three linearly independent axes for sensing the three dimensional angular movement. Thus, if the basic controller 101 has a tri-axial accelerometer, the dongle 103 should include self-contained inertial sensors, that when combined with the tri-axial accelerometer in the basic controller, provide for the sensing of motion in all six degrees of freedom.

With respect to FIG. 2, a component 202 may be banded in a fixed position and orientation to a basic controller 201 by strap 203. In the rudimentary illustration of the embodiment, two game controllers are banded together. However, component 202 may also be an appropriate self-contained inertial sensor mounted in a housing supporting the self-contained inertial sensor. Where the basic controller 201 has a conventional tri-axial accelerometer, component 202 should include enough additional self-contained inertial sensors so that the combined output of the tri-axial accelerometer and the additional sensors is sufficient to track all six degrees of freedom. Here again, irrespective of the sensor housing, there must be an implementation in either hardware or software for combining the outputs of the plurality of self-contained inertial sensors forming the composite game controller so as to provide a unitary output from the composite game controller representative of the linear and angular motion of the moving composite controller.

With reference to FIG. 3, another rudimentary illustration similar to FIG. 2 is shown. A basic controller 301 is mounted on a rigid planar supporting substrate 305. For the purpose of this illustrative embodiment, two additional components 302 and 303 are also mounted on the substrate 305. Each of the components provides at least one self-contained inertial sensor. It should be noted that for convenience in illustration for the rudimentary embodiment of FIG. 3, three game controllers which include self-contained inertial sensors are banded together by band 304 in fixed positions and orientation with respect to one another, the two self-contained inertial sensor containing components 302 and 303, banded to controller 301, need not be controllers. Components 302 and 303 may be appropriate self-contained inertial sensors mounted in housings supporting the self-contained inertial sensors. Whether the ancillary components 302 and 303 are controllers or just the necessary self-contained inertial sensors, there must be an implementation for combining the outputs of the plurality of self-contained inertial sensors forming the composite game controller so as to provide a unitary output from the composite game controller representative of the linear and angular motion of the moving composite controller.

In each of the composite controllers depicted in FIGS. 1-3, there may be provided some form of data transmission channel between the attached self-contained inertial sensor component and the basic controller. A conventional short range wireless RF transmissions e.g., a Bluetooth™ system, may be used, for example, to transmit data from attached component 202 to the basic controller 201 wherein the outputs could be correlated. Alternatively, the data representative of the angular and/or linear motion of each of components 201 and 202 could be wirelessly transmitted to the computer controlled game display, and correlated by the game display computer to provide the angular and linear motion of the composite controller required for playing the computer game.

Figure 4:
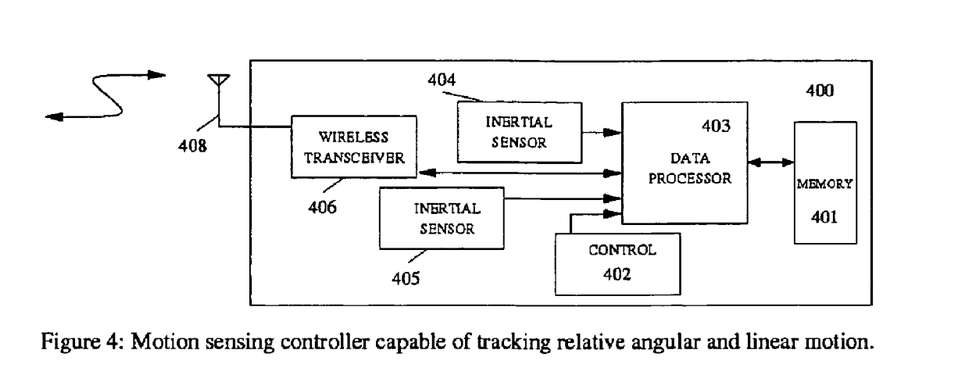
FIG. 4 is a generalized illustrative representation of the apparatus in a game controller in accordance with the present invention.

In accordance with a broad aspect of the present invention, as illustrated in FIG. 4, all of the self-contained inertial sensors needed to provide the sensing along six axes, needed to practice the present invention, may be built into one game controller.

As set forth herein above, the combined self-contained inertial sensors must provide for sensing the total of three linear and three angular axes in order to track unconstrained motion by the user. This requirement may be satisfied in a variety of ways. In particular, any combination of accelerometers and gyroscopes providing readings on at least six distinct axes with at most three gyroscopes will be sufficient if positioned appropriately. When using one tri-axial accelerometer and one tri-axial gyroscope, the sensors may be placed in any known relation to one another. When less than three readings of angular velocity are present, the location and orientation of the combined self-contained inertial sensors with respect to each other is important in order to provide a feasible operative embodiment. Although many combinations of such locations and orientations would be feasible for any given set of self-contained inertial sensors, reference may be made to the above referenced publication, "*Design and Error Analysis of Accelerometer-Based Inertial Navigation Systems*" by Chin-Woo Tan et al., Published in June, 2002 by the University of California at Berkeley for the State of California PATH Transit and Highway System, for determining such feasible combinations when using accelerometers.

Considering now the correlation of the mounted self-contained inertial sensors, in any of FIGS. 1-3, wherein each of the three embodiments may be considered to be a wireless composite game controller, the result is a system that includes a set of self-contained inertial sensors and programming routines that can convert acceleration and angular velocity data recorded by the device at each time t into the information sufficient to compute a new location and orientation of the device in the world frame at time t. For appropriate conversions, reference is made to the above described publication "*Design and Error Analysis of Accelerometer-Based Inertial Navigation Systems*" by Chin-Woo Tan et al., particularly Equation 2.7 on page 6 wherein it is set forth that accelerometer outputs are a function of linear acceleration in the world frame and angular acceleration in the body frame. The application in the above referenced paper assumes the use of six single-axis accelerometers, but Equation 2.7 can be easily modified to handle one or more gyroscopes instead of accelerometers by directly substituting the observed angular velocities and taking derivatives to calculate angular accelerations. Solving these equations then allows the system to track the position and orientation of a fixed point within the controller over time. All of the self-contained inertial sensors in any of the components in each of the embodiments must be positioned and oriented so as to provide a combination of self-contained inertial sensors feasible to provide outputs sufficient to compute the linear and angular motion of the moving controller as described above. While not all such sensor configurations are feasible, it has surprisingly been found that almost all of the configurations using six accelerometers turn out to be feasible. Thus, the configurations of accelerometer positions and orientations need only be grossly rather than finely adjusted in the formation of the composite game controller.

With respect to the above referenced Tan et al., California PATH Program publication, it should also be noted that the purpose of the present invention is the tracking of motion on centimeter-scale accuracy on a time scale of seconds, rather than on the vehicular scale of the publication: tens of meters scale accuracy on a time scale of tens of minutes.

More specifically with respect to the structures shown in the figures, the advantage of the embodiment of FIG. 1 is that the dongle plug-in represents a practical embodiment of the present invention. As set forth above, a motion sensing dongle 103 is plugged into the expansion port 102 of an existing motion sensing game controller 101. For example, if the motion sensing game controller is a Nintendo Wii Remote™, then the dongle plugs in to its expansion port. This embodiment is commercially feasible since it relies only on one motion sensing game controller with is available to every consumer of a motion sensing enabled games console (e.g. the Nintendo Wii system). A new dongle containing a plurality of self-contained inertial sensors may then be produced at reasonable cost. No special effort is required to extract desirable motion data out of this configuration because of the interconnection into the basic controller, e.g. Wii Remote controller. As will be subsequently described with respect to FIG. 5, the game controller signal that is directed from the controller to the game display will contain the output from the tri-axial accelerometer in the Wii Remote and the correlated output from the plurality of self-contained motion sensors in the dongle.

In accordance with another aspect of the embodiment of FIG. 1, the attached dongle contains enough additional self-contained inertial sensors that when combined with the motion sensing game controller's sensors (e.g., a tri-axial accelerometer), the resulting combination of sensor readings is sufficient to estimate the position and orientation of the controller over time. The dongle alone may not necessarily be enough to fully specify all six variables but by selecting the number of self-contained inertial sensors and their approximate positioning in the dongle, it becomes possible through the attachment of such a dongle to a basic game controller such as a Wii remote to create a composite controller with the ability to track motion and orientation in all six dimensions even though each device has insufficient data individually. Assuming the basic game controller possesses a tri-axial accelerometer, possible embodiments of the dongle would include gyroscopes covering three linearly independent axes, or fewer gyroscopes with additional accelerometers to estimate angular acceleration. If a gyroscope is not available to measure angular velocity around the axis running from the tri-axial accelerometer in the basic controller to the inertial sensors in the dongle, it may be necessary to constrain the user's motion in order to get accurate state estimation, since the accelerometers will be unable to directly detect angular acceleration around this axis. The constraint is passed through by the system to inform any user of the system that they need to limit this movement of their wrist as much as they can.

An alternate embodiment is shown in FIG. 2, where multiple game controllers are combined in order to form a composite controller whose joint sensors provide for the sensing of the total of six linear/angular axes. Additional advantages may be found by including more than two controllers or using more sensors than needed to measure along the three linearly independent linear axes and three linearly independent angular axes. Note that as described in the above embodiment, it may still be necessary to restrict the user's motion in some manner if the configuration of the composite controller disallows measurements along one or more of the angular axes. However, if the readings of the sensors are linearly independent, the methods described in the Tan et al. publication will be sufficient to solve for all six axes even if only accelerometers are available for use.

One advantage of the embodiment of FIG. 2 is that it may allow construction of the composite controller by the user from existing basic controllers. However, this method would likely then require a per-device calibration process to render the configuration known to the system. This can be implemented by having the user place the composite controller in a series of simple static poses (rather than moving the controller along precise arcs). On a flat surface, the controller is permitted to rest for a few moments with the manufacturer's faceplate of each motion sensing game controller resting on a flat surface (i.e. the y axis of each is aligned with gravity). This simple static process allows tuning of the configuration of the above referenced algorithm so that it aligns more closely with what the user has actually produced. As set forth herein and above in combining accelerometers to provide for the tracking of linear and angular motion, even gross positioning of the accelerometers with respect to one another will provide some level of tracking for these motion attributes. Accordingly, relatively gross levels of accuracy of accelerometer alignment may be enhanced by domain-level feed-back into the system which help dampen the errors in positioning that may eventually accumulate. Accordingly, it becomes possible to extrapolate acceleration reading accuracy to compensate for only educated guesses as to the optimum positioning of the controllers.

The above general algorithm may be extended to report results only at the end of one or more repeated motions, wherein each motion starts with identical initial constraints, and follows essentially the same track in time and space, with final velocities and accelerations being zero. Let m>=1, be the number of those repeated motions. Final motion track estimation may then take as input all m solutions over time, as well as optionally all m sets of data of time series sensor readings, for linear and angular accelerations for the controller and output one final solution which is computed as a function of the m inputs.

Further, the algorithm may be extended to use accelerometer-based motion recognition to constrain which repeated motions are acceptable as inputs to this final motion track estimator. Since each controller of this invention provides a motion signal, through appropriate training or calibration sessions with the proposed user, the gestures may be classified as to their provision of acceptable motion signals. Then, motions that are significantly different from the original can be identified and removed from the aggregation process described above.

The algorithm may be extended to inform the system when the controller has accumulated so much error that it is no longer providing reasonable tracking information. The algorithm may also be extended with additional assumptions such as that the computed velocities are not permitted to exceed human limitations at any point in time t, and along any axis.

Figure 5:
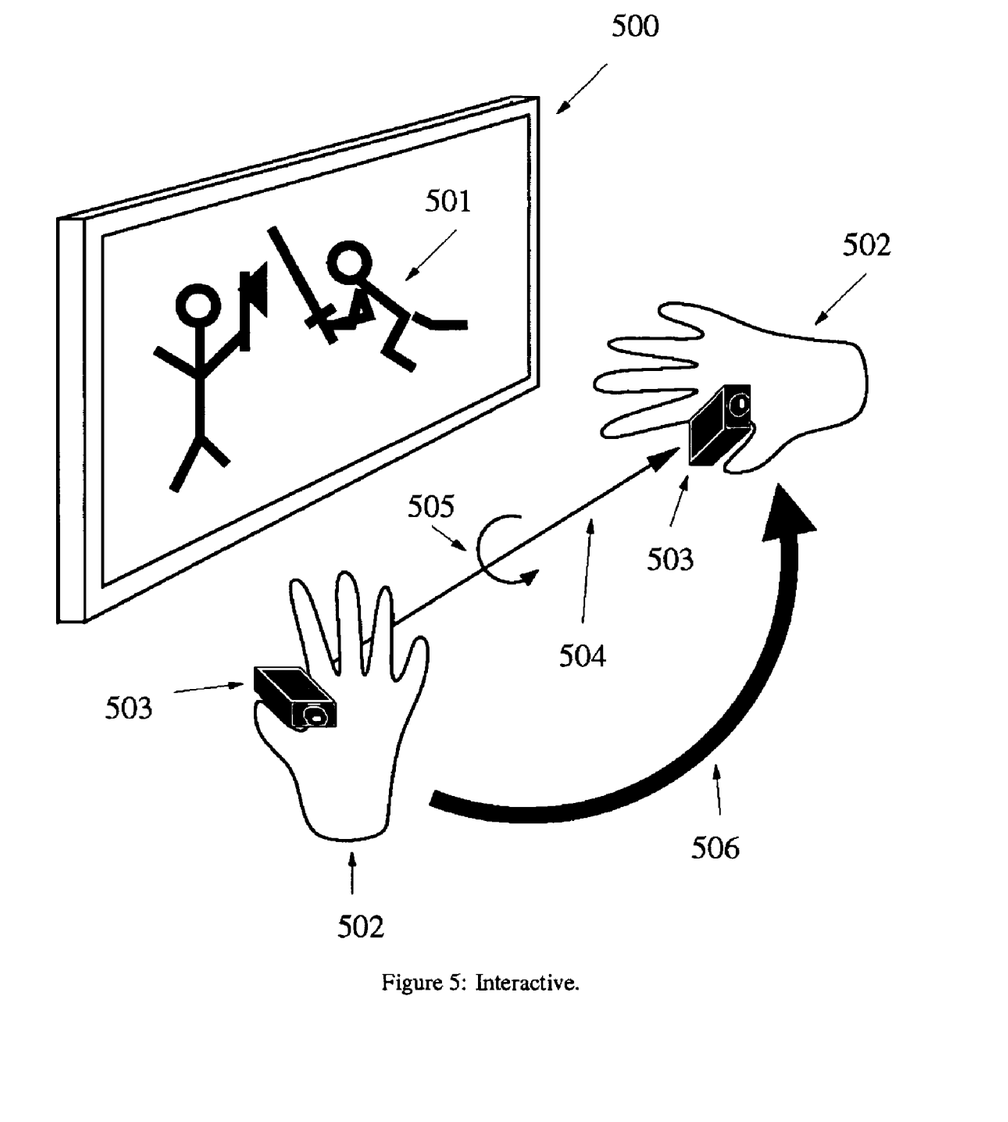
FIG. 5 is an illustrative diagram showing the three dimensional linear motion and angular orientation of the sensed handheld wireless game controller with respect to a displayed computer game.

FIG. 5 is a simple diagrammatic illustration of what has been described with respect to the apparatus of FIGS. 1-4. Computer controlled interactive game display 500 has game action 501 which is controlled by a game controller 503 which may preferably be a composite controller in accordance with the present invention carried along some path 506, which has a linear component 504 and an angular component 505, by a player's moving hand 502.

The programming in the computer controlled display 500 and in the handheld controller 503 assumes that the player holds the controller in some starting position. As the player moves the controller, the programming is able to estimate the relative position and orientation of the controller 503 reliably for several seconds. During that time, a game 500 is able to draw 501 a representation of the controller's state. Known techniques, such as inverse kinematics, allow the state of the controller to drive an animation in a game. For example, a game character could swing a virtual sword in a manner that is similar to the way the player swung the physical controller.

The location of the boundary of the game, i.e. the limits of the controller 503 movement with respect to the game display 500, is arbitrary and domain-dependent. Preferably there is a radius around initial location of the game display which is about the operational range of most game controllers.

Figure 6:
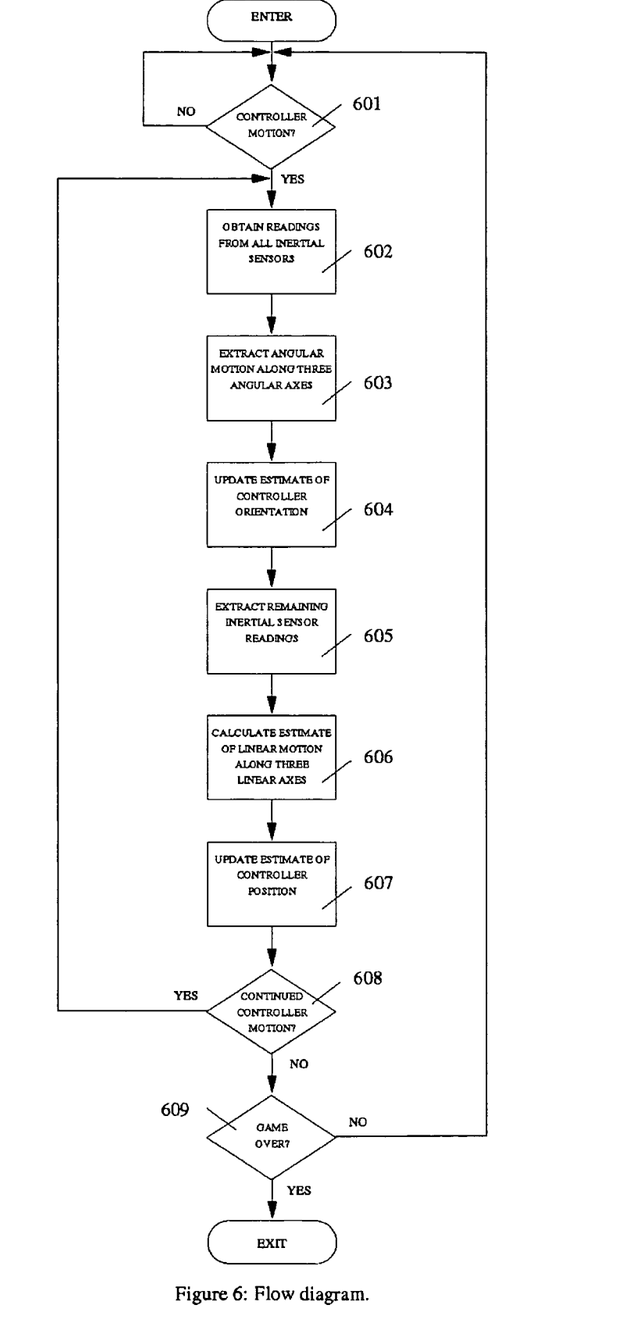
FIG. 6 is a generalized flowchart of the programming in the operation of the invention with a controller for a computer controlled game display.

Referring now to FIG. 6, there will be described a generalized flowchart of the programming in the operation of the invention using a game controller for a computer controlled game display, as has been described with respect to FIG. 5.

An initial determination is made as to if the user has started the controller motion, step 601. In regard to the initial state of the controller, the following constraints are suggested: initial velocities and accelerations are zero. If the initial determination of motion is "Yes", then the readings from all the sensors in the controller must be obtained. In the case of a composite controller, this includes all sensor readings from the basic controller as well as all reading from any sensors associated with other components that comprise the composite controller. Typically, the sensor values are read at some suitable high frequency and, at an appropriate point consistent with the computer game being played, the data from the sensor readings is output to the computer controlled game display via the previously described short range RF transmission, step 602. Note that, transmission of the sensor readings data typically occurs hundreds of times a second whenever the controller and computer controlled game display are turned on. So step 602 merely implies that the computer controlled game display will start to process those readings in a manner consistent with the invention. Next, the processor associated with the computer controlled game display executes step 603 in which the angular motion is extracted from the sensor readings. This step will depend on the particular configuration of sensors used. For example, if three gyroscopes are used, then the gyroscopes will provide readings of angular velocity which can be integrated once to obtain the relative angular motion, i.e. the change in orientation. If accelerometers are used instead, then the readings will provide angular acceleration which can be integrated twice to obtain the relative angular motion. Of course, gyroscopes could be used for some angular axes and accelerometers for others, in which case step 603 will perform the appropriate action of integrating once for readings from gyroscopes and twice for readings from accelerometers. The change in orientation calculated in step 603, is then used in step 604 to update the previous orientation estimate by adding in the change in orientation. The sensor readings not used in calculating the angular motion are then extracted from the sensor readings data, step 605. Typically, the remaining sensor readings will be from accelerometers and the estimate of the angular motion from step 603 can be factored out of those accelerometer readings, step 606, to leave the accelerations due to linear motion along all three linear axes, i.e. the change in position. Then the position of the controller can be updated, step 607, using the estimated change in position calculated in step 606. As the controller continues to be moved, a determination is made as to whether the movement is being continued, step 608. If Yes, the process is returned to step 602, and movement tracking is continued. If No, a further determination is made as to whether the game is over, step 609. If Yes, the game is exited. If No, the process is branched back to step 601 wherein the player's next controller movement is awaited.

Alternative Embodiments

While the preferred embodiments of this invention have been described above, there are many variations which can be understood and derived from the concept and principles set forth.

Such potential variations and embodiments include the following.

In the case of some game controller configurations, clever game design can be used to take advantage of some set of assumptions to give an illusion of enhanced motion tracking. For example, a player may be instructed to hold the controller in a certain way and move along a certain axis. Analysis of the sensor data can then allow a corresponding animation to be rendered. However, this approach has its limitations. If the player violates any of the assumptions, the animation produced will typically not correspond to the actual players motion.

In some cases, sensor data provided by the controllers of this invention may be analyzed and compared to a provided standard data output that corresponds to specific animations. The animation to which the sensor data is the best match is then selected and played. It is also possible to modify the selected animation based on the degree of correspondence between the sensor data and the best match. For example, if the sensor data indicates that the motion is a faster version of some provided animation, then the animation can be played at a correspondingly faster speed.

Most currently available game controllers do not contain the required six axial accelerometer configuration to fully determine the player's actual motion in a gyroscope-free controller. For example, in some modern game controllers there are only three approximately co-located accelerometers or a single tri-axial accelerometer. Using such controllers to render an animation on the screen that corresponds to a player's motion requires strong assumptions to be made about the player's intended motion. In some cases, this requirement can be mitigated with known techniques. For example, some modern game controllers contain an infrared sensor that when pointing at some direct point device (DPD) provides additional information that can be used to determine more information about player movement. However, the player's movement has to be restricted to a narrow range of motions that keep the DPD within range of the infrared sensor.

The concepts of the present invention may be extended to add more sensors into the system. The above described general algorithm may be extended to such configurations. For example, there could be three motion sensing game controllers have nine accelerometer sensing axes, not just six. The sensing of the three additional axes could provide feedback to be applied to the general algorithm.

Similarly, the general algorithm could be applied to shorten time. There may be many potential competing errors in the system. The samples/sec. may be reduced to limit sensitivity over time, while trading off against integration errors. This in part is based on time scale in which a human movement occurs. Based on the concept of the present invention, a cube with accelerometers placed in a certain configuration on each face can reliably track position and orientation of the controller for longer periods of time. Such a cube could be mounted on a controller, e.g., via an appropriate dongle connection.

In configuring the composite structure of the self-contained inertial sensors, whether in or out of controllers, so as to select the best position and orientation of those sensors to provide a feasible composite controller, additional parameters that describe each sensor and the physical relationship of the different sensors within a sufficiently rigid body must be taken into account. For example, the configuration estimate for the composite controllers in FIGS. 1-3 could include estimates of:

the self-contained inertial sensor reading when the device is at rest;
the upper and lower range of the self-contained inertial sensor;
the sensitivity of the self-contained inertial sensor;
how the sensitivity varies with time, temperature, and other conditions;
the relative positions of the individual self-contained inertial sensors within the controller;
the physical size of the controller.
the distance between each controller;
the relative orientation of each controller from one another
the relative position of the center of mass of each controller.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

The invention claimed is:

1. A method comprising:
augmenting a device by attaching removably a case thereto, the device containing a first set of less than six self-contained inertial sensors;
providing a second set of less than six self-contained inertial sensors housed in the case, outputs of the second set of inertial sensors being coupled to the device externally through a connection, wherein there are at least six of the self-contained inertial sensors in the first set and the second set in total;
providing, in response to correlated outputs from the first and second sets of the self-contained inertial sensors, an augmented time series including sufficient information to track changes in both position and orientation of the device being manipulated by a user in a three-dimensional space.

2. A method as in claim 1, further comprising providing, in response to that augmented time series, a set of tracked changes in both position and orientation of the device in the three-dimensional space.

3. A method as in claim 2, further including combining a first time series responsive to one or more of the first set of sensors with a second time series responsive to one or more of the second set of sensors.

4. A method as in claim 3, wherein the step of combining is responsive to at least one of:
a substantially known or detectable configuration of one or more of the self-contained inertial sensors in the first set with respect to one or more of the self-contained inertial sensors in the second set; and
a substantially known or detectable timing relationship between one or more of the self-contained inertial sensors in the first set with respect to one or more of the self-contained inertial sensors in the second set.

5. A method as in claim 1, including a model being responsive to changes in either position or orientation of an object in the three-dimensional space.

6. A method as in claim 1, wherein one or more of the sensors in the first set and the second set is substantially movable in at least one of position or orientation by a human motive force.

7. A method as in claim 1, wherein the device is at least one of: handheld, wearable, attachable to a living creature.

8. A method as in claim 1, wherein the device is configurable with at least one of: a game, video game, video simulation, a medical device, a robotic device, a toy, a communication system, and a navigation system.

9. A method for interacting with a video game being displayed on a display screen, the method comprising:
detecting a first set of less than six first self-contained inertial sensors being enclosed in a first device that is independently operable, the first device being insufficient to track changes in both position and orientation of the first device in a three-dimensional space; and
detecting a second sets of less than six second self-contained inertial sensors enclosed in a second device being operable independently, the second device being insufficient to track changes in both position and orientation of the second device in a three-dimensional space;

restricting that first and second devices into a defined configuration to determine a set of restrictions of movement of the first and second devices, wherein outputs of the second set of inertial sensors in the second device are coupled to the first device via a wireless link to be correlated with the outputs of the first set of inertial sensors in the first device, wherein for a combination including substantially of (a) a first time series responsive to that first self-contained inertial sensors, (b) a second time series responsive to that second self-contained inertial sensors, and (c) a set of third assumptions being substantially less restrictive than those first assumptions and those second assumptions, that combination includes sufficient information to track changes in both position and orientation of that first and second devices being manipulated by a user in a three-dimensional space to control a character in the video game.

10. A method as in claim 9, further including providing, in response to that sufficient information, a set of tracked changes in both position and orientation of that first and second devices in the three-dimensional space.

11. A method as in claim 10, further comprising combining the first time series responsive to one or more of the first set of sensors with the second time series responsive to one or more of the second set of sensors.

12. A method as in claim 11, wherein the step of combining is responsive to at least one of
 a substantially known or detectable configuration of one or more of those first sensors with respect to one or more of those second self-contained inertial sensors; and
 a substantially known or detectable timing relationship between one or more of those first sensors with respect to one or more of those self-contained inertial second sensors,
 at least one of (a) that substantially known or detectable configuration, (b) that substantially known or detectable timing relationship, being responsive to those steps of restricting.

13. A method as in claim 9, including a model being responsive to changes in either position or orientation of an object in the three-dimensional space.

14. A method as in claim 9, wherein
 one or more of those self-contained inertial sensors is substantially movable in at least one of position or orientation by a human motive force.

15. A method as in claim 9, wherein an object in the three-dimensional space is at least one of: handheld, wearable, attachable to a living creature.

16. A method as in claim 9, wherein an object in the three-dimensional space is configurable with at least one of: a game, video game, video simulation, a medical device, a robotic device, a toy, a communication system, and a navigation system.

17. A method for interacting with a video game being displayed on a display screen, the method comprising:
 detecting a set of less than six first self-contained inertial sensors enclosed in a device independently operable, the first self-contained inertial sensors being insufficient to concurrently track substantially unconstrained changes in both position and orientation of the device in a three-dimensional space; and
 detecting a set of less than six second self-contained inertial sensors enclosed in a separate package, that second self-contained inertial sensors being insufficient to concurrently track substantially unconstrained changes in both the position and the orientation of the device in the three-dimensional space;

restricting the device and the package into a defined configuration that is provided to determine a set of restrictions of movement of the first self-contained inertial sensors and the second self-contained inertial sensors with respect to each other, wherein signals from the second inertial sensors of the separate package are coupled to a port of the device that is configured to correlate signals from the first inertial sensors of the device and the signals from the inertial sensors of the separate package, wherein a combination of a first time series responsive to the first self-contained inertial sensors and a second time series responsive to the second self-contained inertial sensors includes sufficient information to concurrently track substantially unconstrained changes in both position and orientation of an object in a three-dimensional space.

18. A method as in claim 17, including steps of
providing, in response to that sufficient information, a set of tracked changes in both position and orientation of the object in a three-dimensional space.

19. A method as in claim 18, further comprising combining the first time series responsive to one or more of the first self-contained inertial sensors with the second time series responsive to one or more of the second self-contained inertial sensors.

20. A method as in claim 19, wherein the step of combining is responsive to at least one of
 a substantially known or detectable configuration of one or more of the first self-contained inertial sensors with respect to one or more of the second self-contained inertial sensors; and
 a substantially known or detectable timing relationship between one or more of the first self-contained inertial sensors with respect to one or more of the second self-contained inertial sensors,
 at least one of (a) the substantially known or detectable configuration, (b) the substantially known or detectable timing relationship, being responsive to the steps of restricting.

21. A method as in claim 17, including a model being responsive to changes in either position or orientation of that object in a three-dimensional space.

22. A method as in claim 17, wherein
 one or more of the first and second self-contained inertial sensors is substantially movable in at least one of position or orientation by a human motive force.

23. A method as in claim 17, wherein the object is at least one of: handheld, wearable, attachable to a living creature.

24. A method as in claim 17, wherein the object is configurable with at least one of: a game, video game, or video simulation; a medical device; a robotic device; a toy, a communication system, and a navigation system.

25. A method for interacting with a video game being displayed on a display screen, the method comprising:
 augmenting a device by attaching removably a case thereto, the device containing a first set of less than six self-contained inertial sensors and being operable independently, the first set of sensors being insufficient by itself to concurrently track substantially unconstrained changes in both position and orientation of the device in a three-dimensional space;

the augmenting including steps of providing a second set of less than six self-contained inertial sensors housed in the case, a total number of the self-contained inertial sensors in the first set and the second set is at least six;

enforcing substantial restrictions on movement of the device and the case with respect to each other;

providing, in response to those first and second set of self-contained inertial sensors, sufficient information to track substantially unconstrained changes in both position and orientation of that device in the three-dimensional space in response to those first and second sets of sensors and those restrictions on movement.

26. A method as in claim 25, further comprising:

in response to that sufficient information, tracking substantially unconstrained changes in both position and orientation of that object in a three-dimensional space in response to those first and second sets of self-contained inertial sensors and those restrictions on movement.

27. A method as in claim 26, wherein the step of tracking includes combining a first time series responsive to one or more of the first set of sensors with a second time series responsive to one or more of the second set of sensors.

28. A method as in claim 27, wherein the step of combining is responsive to at least one of:

a substantially known or detectable configuration of one or more of the first self-contained inertial sensors with respect to one or more of the second self-contained inertial sensors; and a substantially known or detectable timing relationship between one or more of the first self-contained inertial sensors with respect to one or more of the second self-contained inertial sensors, at least one of (a) the substantially known or detectable configuration, (b) the substantially known or detectable timing relationship, being responsive to the step of enforcing substantial restrictions.

29. A method as in claim 25, including a model, the model being responsive to changes in either position or orientation of the object in the three-dimensional space.

30. A method as in claim 25, wherein one or more of the self-contained inertial sensors in the first and second sets is substantially movable in at least one of position or orientation by a human motive force.

31. A method as in claim 25, wherein the device is at least one of: handheld, wearable, attachable to a living creature.

32. A method as in claim 25, wherein the device is configurable with at least one of: a game, video game, video simulation, a medical device, a robotic device; a toy, a communication system, and a navigation system.

33. A method for interacting with a video game being displayed on a display screen, the method comprising augmenting a device by attaching a case thereto, the device containing a first set of less than six self-contained inertial sensors, the first set of self-contained inertial sensors being insufficient to concurrently track substantially unconstrained changes in both position and orientation of the device in a three-dimensional space;

the step of augmenting including steps of:

providing a second set of less than six self-contained inertial sensors enclosed in the case, a total number of the self-contained inertial sensors in the first set and second set is at least six;

receiving in the device signals from the second set of inertial sensors of the case; and providing an augmented time series in response to the first and second sets of self-contained inertial sensors, the augmented time series including sufficient information to concurrently track substantially unconstrained changes in both position and orientation of the device being manipulated by a user in a three-dimensional space to control a character in the video game.

34. A method as in claim 33, further comprising providing, in response to the sufficient information, a set of tracked changes in both position and orientation of an object in a three-dimensional space.

35. A method as in claim 34, further comprising combining a first time series responsive to one or more of the first set of self-contained inertial sensors with a second time series responsive to one or more of the second set of self-contained inertial sensors.

36. A method as in claim 35, wherein the step of combining is responsive to at least one of a substantially known or detectable configuration of one or more of the first self-contained inertial sensors with respect to one or more of the second self-contained inertial sensors; and a substantially known or detectable timing relationship between one or more of the first self-contained inertial sensors with respect to one or more of the second self-contained inertial sensors.

37. A method as in claim 33, including a model, the model being responsive to changes in either position or orientation of the object in the three-dimensional space.

38. A method as in claim 33, wherein one or more of the inertial sensors is substantially movable in at least one of position or orientation by a human motive force.

39. A method as in claim 33, wherein the device is at least one of: handheld, wearable, attachable to a living creature.

40. A method as in claim 33, wherein the device is configurable with at least one of: a game, video game, video simulation, a medical device, a robotic device; a toy, a communication system, and a navigation system.

41. A method for interacting with a video game being displayed on a display screen, the method comprising:

augmenting a device by attaching a case thereto, the device including a first set of less than six first self-contained inertial sensors and being unable by itself to concurrently track substantially unconstrained changes in both position and orientation of the device in a three-dimensional space;

providing a second set of less than six second self-contained inertial sensors enclosed in the case, a total number of the first and second self-contained inertial sensors being at least six in total, wherein signals from the second set of inertial sensors in the case are coupled to the device that is configured to correlate signals from the first set of the inertial sensors with the signals of the second set;

providing an augmented time series in response to the set of first and second self-contained inertial sensors, the augmented time series including sufficient information to concurrently track substantially unconstrained changes in both position and orientation of the device being manipulated by a user in a three-dimensional space to control a character in the video game.

42. A method as in claim 41, further comprising providing, in response to the sufficient information, a set of tracked changes in both position and orientation of an object in a three-dimensional space.

43. A method as in claim 42, wherein the step of providing includes steps of combining a first time series responsive to one or more of the first self-contained inertial sensors with a second time series responsive to one or more of the second self-contained inertial sensors.

44. A method as in claim 43, wherein the step of combining is responsive to at least one of:
a substantially known or detectable configuration of one or more of the first self-contained inertial sensors with respect to one or more of the second self-contained inertial sensors; and
a substantially known or detectable timing relationship between one or more of the first self-contained inertial sensors with respect to one or more of the second self-contained inertial sensors.

45. A method as in claim 42, including a model being responsive to changes in either position or orientation of the object in the three-dimensional space.

46. A method as in claim 41, wherein one or more of the first and second set of self-contained inertial sensors is substantially movable in at least one of position or orientation by a human motive force.

47. A method as in claim 41, wherein the device is at least one of: handheld, wearable, attachable to a living creature.

48. A method as in claim 41, wherein the device is configurable to couple the second set of self-contained inertial sensors to a power source.

49. A method as in claim 41, wherein the device is configurable to couple the first set of self-contained inertial sensors to a communication element.

50. A method as in claim 49, further comprising operating the device to couple the first and second self-contained inertial sensors to a model of position and orientation of the object in the three-dimensional space.

51. A method as in claim 50, wherein the model of position and orientation includes at least one of: a game, video game, video simulation, a medical device, a robotic device; and a toy.

52. A method as in claim 41, wherein the device includes sensors other than self-contained inertial sensors.

53. A method as in claim 41, including steps of providing at least one output signal from the device, wherein the step of providing is responsive to at least one of:
a substantially known or detectable configuration of that device with respect to those second sensors, and
a substantially known or detectable timing relationship of with respect to that output signal and those second sensors.

54. A method as in claim 41, wherein the step of providing includes restricting the device to a substantially known or detectable configuration with respect to the second set of self-contained inertial sensors.

55. A method as in claim 41, wherein at least one of the first and second sensors includes at least one of: an accelerometer, a gyroscope, a compass, an electromagnetic field sensor, a Hall effect sensor, a Doppler sensor, an optical recognizer, and a sonic device.

56. A method comprising:
providing at least six self-contained inertial sensors into a movable controller, the inertial sensors generating sensing signals when the movable controller is being moved, wherein among said at least six self-contained inertial sensors there must be three for linear acceleration along three linear axes and three for determining angular motion;
correlating the sensing signals so that both three-dimensional linear translation and angular orientation of the moving controller is accurately tracked; and
providing a model of a fictional world, the model being responsive to changes in either position or orientation of the movable controller.

57. A method as in claim 56, further comprising:
generating a time series of information in accordance with said at least six self-contained inertial sensors; and
providing, in response to that time series, a set of tracked changes in both position and orientation of the movable controller in a three-dimensional space.

58. A method as in claim 57, further comprising combining a first time series responsive to a first set of the self-contained inertial sensors with a second time series responsive to a second set of the self-contained inertial sensors.

59. A method as in claim 58, wherein said combining is responsive to at least one of:
a substantially known or detectable configuration of one or more of the first set of self-contained inertial sensors with respect to one or more of the second set of self-contained inertial sensors; and
a substantially known or detectable timing relationship between one or more of the first set of self-contained inertial sensors with respect to one or more of the second self-contained inertial sensors.

60. A method as in claim 56, comprising configuring the first and second set of self-contained inertial sensors with at least one of: a game, video game, video simulation, a medical device; a robotic device a toy a communication system and a navigation system.

61. A method as in claim 56, wherein the model is responsive to changes in either position or orientation of a movable controller in a three-dimensional space.

62. A method as in claim 56, wherein the model includes at least one of: a game, video game, or video simulation, a medical device, a robotic device, and a toy.

63. A method as in claim 56, providing sensors include other than self-contained inertial sensors.

64. A method as in claim 56, wherein the sensors include at least one of: an accelerometer, a gyroscope; a compass, an electromagnetic field sensor, a Hall effect sensor, a Doppler sensor, an optical recognizer, and a sonic device.

65. A method as in claim 56, comprising presenting one or more images in response to the model, and the sensors.

66. A method as in claim 65, wherein the step of presenting is responsive to a substantially known or detectable configuration of the device with respect to the sensors.

67. An apparatus for controlling a character in a video game comprising:
a first device being operable independently and including a first set of less than six self-contained inertial sensors, the inertial sensors being insufficient to track changes in both position and orientation of the device in a three-dimensional space; and
a second device including a second sets of less than six self-contained inertial sensors, the second device removably attached to the first device, outputs from the second set of the inertial sensors being coupled via a wireless link to the first device;
elements restricting that first device and second device into a defined configuration, the defined configuration providing information to determine a set of restrictions of movement of the first set of self-contained inertial sensors and the second sets of self-contained inertial sensors with respect to each other, wherein, a combination of a first time series responsive to the first set of self-contained inertial sensors and a second time series responsive to at least one of the second sets of self-contained inertial sensors includes sufficient information to track changes in both position and orientation of the apparatus in the three-dimensional space.

68. An apparatus as in claim 67, including a model, the model being responsive to changes in either position or orientation of an object in a three-dimensional space.

69. An apparatus as in claim 68, wherein one or more of the self-contained inertial sensors in the first set and second set is substantially movable in at least one of position or orientation by a human motive force.

70. An apparatus as in claim 68, wherein the object is at least one of: handheld, wearable, attachable to a living creature.

71. An apparatus as in claim 68, wherein the object is configurable with at least one of: a game, video game, video simulation, a medical device, a robotic device, a toy, a communication system, and a navigation system.

72. An apparatus as in claim 67, including
a combiner responsive to (a) a first time series responsive to one or more of the first set of sensors, and (b) a second time series responsive to one or more of the second set of sensors.

73. An apparatus as in claim 72, wherein the combiner is responsive to at least one of:
a substantially known or detectable configuration of one or more of those first sensors with respect to one or more of those second sensors; and
a substantially known or detectable timing relationship between one or more of those first sensors with respect to one or more of those second sensors.

74. An apparatus for controlling a character in a video game, comprising:
a first set of self-contained inertial sensors enclosed in a first device being insufficient by itself to concurrently track substantially unconstrained changes in both position and orientation of the first device in a three-dimensional space; and
a second sets of self-contained inertial sensors enclosed in a second device being insufficient by itself to concurrently track substantially unconstrained changes in both the position and the orientation of the second device in a three-dimensional space;
elements restricting the first device and the second device into a defined configuration, signals from the second device being coupled to the first device that is configured to correlate the signals with signals from the first set of inertial sensors and that defined configuration providing information to determine a set of restrictions of movement of that first set of sensors and those second sets of sensors with respect to each other,
wherein a combination of a first time series responsive to the first set of sensors and a second time series responsive to at least one of the second sets of sensors, includes sufficient information to concurrently track substantially unconstrained changes in both position and orientation of the apparatus in a three-dimensional space.

75. An apparatus as in claim 74, including
a model, that model being responsive to changes in either position or orientation of that object in a three-dimensional space.

76. An apparatus as in claim 74, wherein one or more of the sensors is substantially movable in at least one of position or orientation by a human motive force.

77. An apparatus as in claim 74, wherein the apparatus is at least one of: handheld, wearable, attachable to a living creature.

78. An apparatus as in claim 74, wherein the apparatus is configurable with at least one of: a game, video game, or video simulation, a medical device, a robotic device, a toy, a communication system, and a navigation system.

79. An apparatus as in claim 74, including a combiner responsive to (a) a first time series responsive to one or more of the first set of sensors, and (b) a second time series responsive to one or more of the second set of sensors.

80. An apparatus as in claim 79, wherein the combiner is responsive to at least one of:
a substantially known or detectable configuration of one or more of the first sensors with respect to one or more of the second sensors; and
a substantially known or detectable timing relationship between one or more of the first sensors with respect to one or more of the second sensors.

81. An apparatus for controlling a character in a video game, comprising:
a first set of less than six first self-contained inertial sensors enclosed in a device independently operable and the device being augmented by attaching a case thereto, the case including a second set of less than six second self-contained inertial sensors, a total number of the first and second self-contained inertial sensors being at least six, those first and second contained inertial sensors collectively providing a time series of information being sufficient information to track changes in both position and orientation of an object in a three-dimensional space; and
a model of a possibly-fictional world being controlled by the device with the case.

82. An Apparatus as in claim 81, wherein the model includes at least one of: a game, video game, or video simulation; a medical device, a robotic device and a toy.

83. An apparatus as in claim 81, wherein the apparatus is substantially movable in at least one of position or orientation by a human motive force unassisted by a mechanical device.

84. An apparatus as in claim 81, wherein the apparatus is at least one of: handheld, wearable, attachable to a living creature.

85. An apparatus as in claim 81, wherein the apparatus is configurable with at least one of: a game, video game, video simulation, a medical device, a robotic device, a toy, a communication system, and a navigation system.

86. An apparatus as in claim 81, including a combiner responsive to (a) a first time series responsive to one or more of the first set of sensors, and (b) a second time series responsive to one or more of the second self-contained inertial sensors.

87. An apparatus as in claim 86, wherein the combiner is responsive to at least one of:
a substantially known or detectable configuration of one or more of those first sensors with respect to one or more of those second sensors; and
a substantially known or detectable timing relationship between one or more of those first self-contained inertial sensors with respect to one or more of those second self-contained inertial sensors.

88. An apparatus as in claim 81, including sensors other than the self-contained inertial sensors.

89. Apparatus as in claim 81, including a presentation device responsive to the model, the sufficient information, and the first and second self-contained inertial sensors.

90. An apparatus as in claim 89, wherein the presentation device is responsive to a substantially known or detectable configuration of the device with respect to the first and second self-contained inertial sensors.

91. An apparatus as in claim 81, wherein at least one of the the first and second self-contained inertial sensors includes at least one of:
an accelerometer, a gyroscope, a compass, an electromagnetic field sensor, a Hall effect sensor, a Doppler sensor, an optical recognizer, and a sonic device.

92. An apparatus as in claim 81, wherein the model is responsive to changes in either position or orientation of the object in the three-dimensional space.

93. An apparatus comprising:
a set of first self-contained inertial sensors collectively providing a first time series of information, the first time series being insufficient by itself to determine at least one of location or orientation of a first device in a three-dimensional space;
a set of second self-contained inertial sensors collectively providing a second time series of information, the second time series being insufficient to determine at least one of location or orientation of a second device in a three-dimensional space, wherein the first and second devices are coupled electronically and enclosed in the apparatus; and
a combiner of that first time series and that second time series, wherein an output of that combiner includes sufficient information to track changes in both position and orientation of the apparatus in a three-dimensional space.

94. An apparatus as in claim 93, wherein that combiner is responsive to at least one of
a substantially known or detectable configuration of one or more of the first sensors with respect to one or more of the second sensors; and
a substantially known or detectable timing relationship between one or more of the first sensors with respect to one or more of the second sensors.

95. An apparatus comprising:
a plurality of inertial sensors providing sensor data sufficient to derive six relative linear and angular motions of the apparatus as the apparatus is caused by the user to move from one location to another location in a three-dimensional space, wherein a processor is configured to correlate the sensor data from the inertial sensors to determine relative positions and orientations of the apparatus with respect to a reference point so that a trajectory of the apparatus is inferred and used to render a corresponding movement in a display,
wherein the apparatus is an integrated controller including a first device and a second device, the first device, capable of operating independently, comprises a transceiver; and the second device, detachably coupled to the first device, comprises some or all of the inertial sensors; and an interface to communicate with the first device to transport some or all of the sensor data from the inertial sensors therein to the first device via the interface so that the first device transports the sensor data, via the transceiver, to a base device that is connected to the display.

96. The apparatus as recited in claim 95, wherein the first device is a basic controller comprising:
a first set including one or more but not all of the inertial sensors, wherein the sensor data from the inertial sensors in the basic controller is insufficient to derive the six relative linear and angular motions of the apparatus:
the second device is an auxiliary device comprising:
a second set including one or more but not all of the inertial sensors, wherein some or all of the sensor data from the inertial sensors in the auxiliary device is transported to the basic controller via the interface so that the sensor data together from the basic controller and the auxiliary device is sufficient to derive the six relative linear and angular motions of the apparatus.

97. The apparatus as recited in claim 96, wherein the auxiliary device does not operate independently and is designed to be operated with the basic controller, any sensing measurement from the auxiliary device is complementary to the basic controller so that a processor in the basic controller is configured to correlate the sensor data from the inertial sensors in the basic controller, if any, and in the auxiliary device.

98. The apparatus as recited in claim 97, wherein the inertial sensors are substantially self-contained, as a result, there is no restriction on movement and there is no setup or configuration of external sources by the user to operate the apparatus.

99. The apparatus as recited in claim 97, wherein the linear and angular motions of the apparatus control an animation of an object being manipulated in a virtual world.

100. The apparatus as recited in claim 95, wherein the processor is configured to adjust elements of the estimated positions and orientations in response to data from at least another sensor, not being one of the plurality of inertial sensors, that provides information about at least one element of absolute positions and orientations of the apparatus.

101. A physical medium maintaining instructions interpretable by a computing device, the instructions being disposed to direct the computing device to:
detect a first set of self-contained inertial sensors enclosed in a first device, that first device being insufficient by itself to concurrently track substantially unconstrained changes in both the position and the orientation of an object in a three-dimensional space; and
detect a second set of self-contained inertial sensors enclosed in a second device, the second device being insufficient by itself to concurrently track substantially unconstrained changes in both the position and the orientation of an object in a three-dimensional space;
restrict those first and second devices into a defined configuration, that defined configuration providing information to determine a set of restrictions of movement of that first set of sensors and those second sets of sensors with respect to each other,
wherein those instructions to restrict provide sufficient information, that a combination of a first time series responsive to that first set of sensors and a second time series responsive to at least one of those second sets of sensors, includes sufficient information to concurrently track substantially unconstrained changes in both position and orientation of that object in a three-dimensional space.

102. A physical medium as in claim 101, including instructions disposed to direct the computing device to provide, in response to a set of tracked changes in both position and orientation of the object in a three-dimensional space.

103. A physical medium as in claim 102, wherein the instructions to provide a set of tracked changes include instructions to combine a first time series responsive to one or more of the first set of sensors with a second time series responsive to one or more of the second set of sensors.

104. A physical medium as in claim 103, wherein the instructions to combine direct the computing device to operate responsive to at least one of
- a substantially known or detectable configuration of one or more of those first sensors with respect to one or more of those second sensors; and
- a substantially known or detectable timing relationship between one or more of those first sensors with respect to one or more of those second sensors,
- at least one of (a) that substantially known or detectable configuration, (b) that substantially known or detectable timing relationship, being responsive to those instructions to restrict.

105. A physical medium maintaining instructions interpretable by a computing device, the instructions being disposed to direct the computing device to:
- augment a device by attaching removably a case thereto, the device containing a first set of less than six self-contained inertial sensors, the device being insufficient by itself to concurrently track substantially unconstrained changes in both the position and the orientation of an associated object in a three-dimensional space;
- the instructions to augment including instructions disposed to direct the computing device to
- provide a second set of self-contained inertial sensors enclosed in a case;
- receive in the device signals from the second set of inertial sensors in the case, and provide an augmented time series in response to those first and second sets of sensors, the augmented time series including sufficient information to concurrently track substantially unconstrained changes in both position and orientation of the associated object in a three-dimensional space.

106. A physical medium as in claim 105, including instructions disposed to direct that computing device to
- provide, in response to that sufficient information, a set of tracked changes in both position and orientation of that object in a three-dimensional space.

107. A physical medium as in claim 106, wherein
- those instructions to provide a set of tracked changes include instructions to combine a first time series responsive to one or more of that first set of sensors with a second time series responsive to one or more of that second set of sensors.

108. A physical medium as in claim 107, wherein
- those instructions to combine direct that computing device to operate responsive to at least one of
- a substantially known or detectable configuration of one or more of those first sensors with respect to one or more of those second sensors; and
- a substantially known or detectable timing relationship between one or more of those first sensors with respect to one or more of those second sensors.

109. A physical medium as in claim 105, wherein
- those instructions to provide an augmented time series include instructions to combine a first time series responsive to one or more of that first set of sensors with a second time series responsive to one or more of that second set of sensors.

110. A physical medium maintaining instructions interpretable by a controlling device, the instructions being disposed to direct the controlling device to:
- generate sensing signals from at least six self-contained inertial sensors enclosed therein, wherein among the at least six self-contained inertial sensors there must be three for linear acceleration along three linear axes and three for determining angular motion;
- provide an augmented time series in response to the inertial sensors, the augmented time series including sufficient information to concurrently track substantially unconstrained changes in both position and orientation of the controlling device in a three-dimensional space, wherein the controlling device is configurable with at least one of: a game, video game, or video simulations a medical device, a robotic device, a toy, a communication system, and a navigation system.

111. A physical medium as in claim 110, including instructions disposed to direct the controlling device to provide, in response to the sufficient information, a set of tracked changes in both position and orientation of the controlling device in a three-dimensional space.

* * * * *